United States Patent
Wang et al.

(10) Patent No.: US 12,293,273 B2
(45) Date of Patent: May 6, 2025

(54) WEIGHTED DEEP FUSION ARCHITECTURE

(71) Applicant: INTERNATIONAL BUSINESS MACHINES CORPORATION, Armonk, NY (US)

(72) Inventors: Xiaolong Wang, Campbell, CA (US); Qinghan Xue, Sunnyvale, CA (US); Abhishek Kolagunda, San Jose, CA (US); Steven Nicholas Eliuk, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 910 days.

(21) Appl. No.: 16/928,094

(22) Filed: Jul. 14, 2020

(65) Prior Publication Data
US 2022/0019867 A1 Jan. 20, 2022

(51) Int. Cl.
G06N 3/04 (2023.01)
G06N 3/08 (2023.01)
G06N 3/10 (2006.01)

(52) U.S. Cl.
CPC ............... *G06N 3/04* (2013.01); *G06N 3/08* (2013.01); *G06N 3/10* (2013.01)

(58) Field of Classification Search
CPC ............... G06N 3/04; G06N 3/08; G06N 3/10
See application file for complete search history.

(56) References Cited

U.S. PATENT DOCUMENTS

| 9,922,272 | B2 | 3/2018 | Cheng |
| 11,417,318 | B2 * | 8/2022 | Reece ............... G10L 15/22 |
| 2018/0217585 | A1 | 8/2018 | Giering |

FOREIGN PATENT DOCUMENTS

| CN | 108629368 A | 10/2018 |
| CN | 109508375 A | 3/2019 |

(Continued)

OTHER PUBLICATIONS

Ortega, J. D., Senoussaoui, M., Granger, E., Pedersoli, M., Cardinal, P., & Koerich, A. L. (2019). Multimodal fusion with deep neural networks for audio-video emotion recognition. arXiv preprint arXiv:1907.03196. (Year: 2019).*

(Continued)

*Primary Examiner* — Kamran Afshar
*Assistant Examiner* — Lokesha G Patel
(74) *Attorney, Agent, or Firm* — Amin, Turocy & Watson, LLP

(57) ABSTRACT

A method, a computer program product, and a computer system fuse features for multi-modal classifications for a plurality of modality inputs. The method includes receiving a request indicative of the modality inputs to be selected. The method includes performing an embeddings level fusion operation to concatenate features from the modality inputs. The method includes performing a multi-modal discriminative feature level fusion operation that integrates feature representations learned by applying different network structures on the modality inputs. The method includes determining weights of the concatenated features and the feature representations based on a measure of the concatenated features and the feature representations indicative of affecting a final prediction performance. The method includes generating fused features for the modality inputs based on the concatenated features, the feature representations, and the weights. The method includes generating a response to the request based on the fused features. The method includes transmitting the response.

20 Claims, 5 Drawing Sheets

(56) References Cited

FOREIGN PATENT DOCUMENTS

| CN | 109993131 A | 7/2019 |
| CN | 110298383 A | 10/2019 |
| CN | 110569869 A | 12/2019 |
| CN | 110674677 A | 1/2020 |

OTHER PUBLICATIONS

Yang, B., Cao, J., Ni, R., & Zhang, Y. (2018). Facial expression recognition using weighted mixture deep neural network based on double-channel facial images. IEEE access, 6, 4630-4640. (Year: 2018).*

Peng, D., Wu, S., & Liu, C. (2019). MPSC: A multiple-perspective semantics-crossover model for matching sentences. IEEE Access, 7, 61320-61330. (Year: 2019).*

Zhan, J., Liu, S., Mo, Z., & Zhu, Y. (2020, July). Multi-similarity semantic correctional hashing for cross modal retrieval. In 2020 IEEE International Conference on Multimedia and Expo (ICME) (pp. 1-6). IEEE. (Year: 2020).*

Mell et al., "The NIST Definition of Cloud Computing", National Institute of Standards and Technology, Special Publication 800-145, Sep. 2011, pp. 1-7.

* cited by examiner

WEIGHTED DEEP FUSION ARCHITECTURE

BACKGROUND

The exemplary embodiments relate generally to feature fusion, and more particularly to an automatic weighted deep fusion architecture for multi-modal classifications that learns the input correlations.

In the era of information explosion, data may be defined based on collected information contained in a plurality of sources. The information may also be easily collected and aggregated through various communication mechanisms such as the Internet. For example, Electronic Health Record (EHR) systems contain various types of patients' information including their demographics, diagnosis codes, image features, and laboratory test results from heterogeneous data sources. A combination of the data from these independent sources may provide a more comprehensive and holistic assessment of early diagnosis since some of the early symptoms of the diseases may appear in one data source but not the other.

However, a system that aggregates data from the different independent sources to learn information from huge amounts of such data is a challenging problem. Conventional approaches conduct fusion of the data by selecting important features from multiple deep architectures such as Convolution Neural Networks (CNN) and Recurrent Neural Networks (RNN). For example, most conventional approaches consider each modality input as an independent entity and learn representations for classification by simply concatenating the learned multi-modalities features from a deep network. Despite these efforts, there are large gaps among the modalities such that a simple concatenation operation does not effectively identify and exploit the correlations information, which lead to the concatenated multi-modal representations being far from ideal. For example, data from multiple sources are inherently noisy, irregularly sampled, and heterogeneous, thereby posing a difficulty to integrate useful data from multiple sources and obtain modalities representations that are sufficiently discriminative.

SUMMARY

The exemplary embodiments disclose a method, a computer program product, and a computer system for fusing features for multi-modal classifications for a plurality of modality inputs. The method comprises receiving a request indicative of the modality inputs to be selected. The method comprises performing an embeddings level fusion operation to concatenate features from the modality inputs. The method comprises performing a multi-modal discriminative feature level fusion operation that integrates feature representations learned by applying different network structures on the modality inputs. The method comprises determining weights of the concatenated features and the feature representations based on a measure of the concatenated features and the feature representations indicative of affecting a final prediction performance. The method comprises generating fused features for the modality inputs based on the concatenated features, the feature representations, and the weights. The method comprises generating a response to the request based on the fused features. The method comprises transmitting the response.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
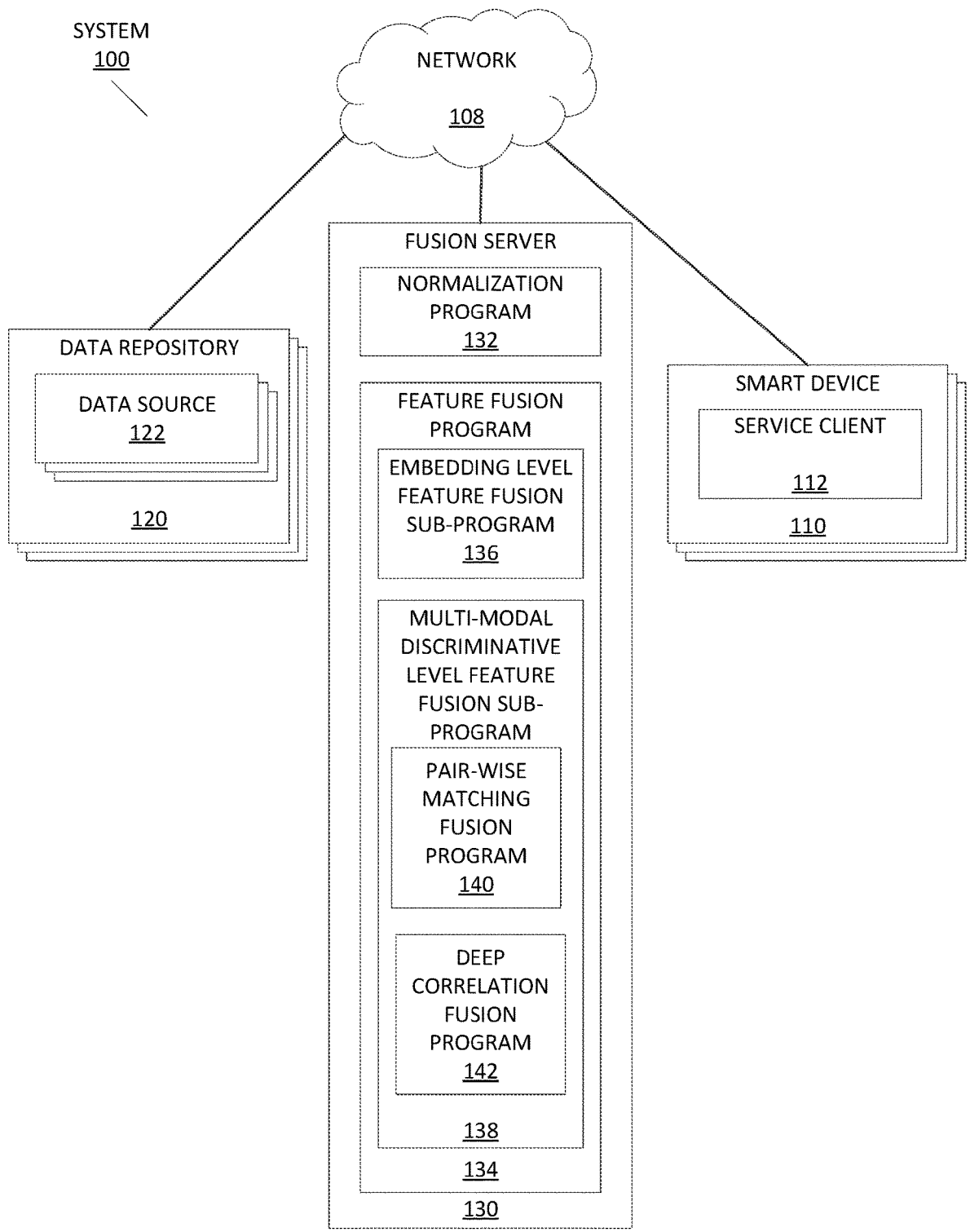
FIG. 1 depicts an exemplary schematic diagram of a weighted deep fusion system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for a comprehensive fusion network constructed to be discriminative and comprehensive that is capable of understanding distinctive representations as well as learn the correlative information among different modality inputs. As will be described in greater detail herein, the exemplary embodiments provide an automatic weighted deep (AWD) fusion mechanism that amplifies the higher quality and informative modalities during fusion in multi-modal classifications. The AWD fusion mechanism according to the exemplary embodiments employs two stage fusion approaches to capture both correlated and independent information in multi-modalities with respect to a depth of the network architecture (e.g., neural network layers) at which the fusion is applied. The AWD fusion mechanism according to the exemplary embodiments may subsequently apply at least one concatenation to fuse features obtained from the two-stage fusion approach to incorporate correlations from the input modalities. Through these operations, the AWD fusion mechanism according to the exemplary embodiments may feed the results to a new classifier (e.g., a classifier neural network) for final predictions which are used to generate the data that may have been requested. Key benefits of the exemplary embodiments may include yielding better performance in comparison to non-fusion or other conventional fusion architectures where the exemplary embodiments are widely applicable to a degree greater than conventional state-of-the-art fusion systems. Detailed implementation of the exemplary embodiments follows.

Conventional approaches to fusion systems for deep multi-modal fusion techniques may utilize early or late fusion. In fusion systems utilizing a late fusion mechanism, the modalities are considered independent by first applying a classification separately on each modality and then merging the outputs using a high-level classifier. Although the late fusion of data from sources may provide certain benefits, the classifier may not be capable of modelling the correlations among modalities. For example, by the time the merging of the output occurs, the correlation information may be lost. The early fusion approach has been proposed to tackle such problems that the late fusion approach may entail by learning features and class relationships to model the interaction between modalities. However, the early fusion approach forgoes the benefits that the late fusion approach provides such as the independent classification capability provided by separate modalities. That is, in fusing the data "early", the independence of the modalities may be lost.

In contrast to the conventional approaches, the exemplary embodiments may apply a plurality of different approaches to fuse different types of features to get more informative and significant features to represent the modalities inputs. Through an embedding level feature fusion approach and a multi-modal discriminative level feature fusion approach, the exemplary embodiments may utilize relevant feature subspaces from multiple modalities while also fusing the extracted representation features from specific layers of the neural network that are trained independently for each modality. The exemplary embodiments further utilize additional architectures to extract correlation information of the modalities inputs. In this manner, the modalities inputs may be considered on both the independent level (e.g., as featured with late fusion approaches) and with the correlation information (e.g., as featured with early fusion approaches). The exemplary embodiments may subsequently stack the outputs of the embedding level feature fusion approach and the multi-modal discriminative level feature fusion approach such that the determined features share the same weights from a dense layer which provides a regularization that makes the modalities force the representations learned from different modalities to share a common sub-space or embedding. The exemplary embodiments may further incorporate the individual predictions (e.g., sum-pooling) from the separate approaches for each of the features to make predictions (e.g., even when only one of the sources is available) that form the basis in determining the response to the request.

The exemplary embodiments are described with regard to feature fusion with deep architectures such as those exhibited by various neural networks in which there are a plurality of modalities inputs. However, the exemplary embodiments may be utilized for fusing of data directed toward any parameter in any architecture or source from which a corresponding form of modality input is used for the fusion where the parameter of the input is considered on an independent level along with correlation to other parameters of the input and other inputs. Those skilled in the art will understand that a "modality" may represent an acquisition framework in which data is stored. Although a modality may be associated with data fusion in a manner consistent with the exemplary embodiments, again, the exemplary embodiments may be configured and/or modified for any type of input.

FIG. 1 depicts a weighted deep fusion system 100, in accordance with the exemplary embodiments. According to the exemplary embodiments, the weighted deep fusion system 100 may include one or more smart devices 110, one or more data repositories 120, and a fusion server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the weighted deep fusion system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the weighted deep fusion system 100 that do not utilize the network 108.

In the exemplary embodiments, the smart device 110 may include a service client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the service client 112 may act as a client in a client-server relationship and may be a software, hardware, and/or firmware based application capable of allowing a user to request data and receive a response to the request via the network 108. In embodiments, the service client 112 may operate as a user interface allowing the user to select a type of data to be requested and present the requested data to the user as well as interact with one or more components of the weighted deep fusion system 100, and utilize various wired and/or wireless connection protocols for data transmission and exchange associated with data that is determined based on fusion operations, including Bluetooth, 2.4 gHz and 5 gHz internet, near-field communication, Z-Wave, Zigbee, etc.

A user may require selected data for a variety of reasons and may utilize a service for which the selected data is requested. The user may utilize the service client 112 to select one or more types of data that is requested. The user may also utilize the service client 112 to input further parameters for which the data is requested. For example, the user may be in a medical field and require an electronic health record (EHR). The user may also enter further parameters such as a patient's name, dates over which the EHR is to reflect, etc. The service client 112 may package and transmit the request to a component of the weighted deep fusion system 100 (e.g., the fusion server 130).

In the exemplary embodiments, the data repository 120 may include one or more data sources 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the data repository 120 is shown as a single device, in other embodiments, the data repository 120 may be comprised of a cluster or plurality of electronic devices, in a modular manner, etc., working together or working independently. While the data repository 120 is also shown as a separate component, in other embodiments, the data repository 120 may be incorporated with one or more of the other components of the weighted deep fusion system 100. For example, the data repository 120 may be incorporated in the fusion server 130. Thus, access to the data repository 120 by the fusion server 130 may be performed locally. In another example, the data repository 120 may be incorporated in the smart device 110. Thus, the fusion operations may be performed based on the data sources 122 stored remotely on the smart device 110. The data repository 120 is described in greater detail as a hardware implementation with reference to FIG. 3, as part of a cloud implementation with reference to FIG. 4, and/or as utilizing functional abstraction layers for processing with reference to FIG. 5.

The data sources 122 may be individual sources from which data may be retrieved and characterized in a plurality of manners. For example, each of the data sources 122 may be formatted, configured, represented, etc. in one or more manners. Specifically, the data sources 122 may be modalities inputs that are used by the fusion server 130. Accordingly, one or more of the data sources 122 may utilize a first representation; further one or more of the data sources 122 may utilize a second representation; etc. In this manner, select ones of the data sources 122 may be homogeneous while being heterogeneous relative to one or more further select ones of the data sources 122. In another example, the data sources 122 may be directed toward one or more features that may be extrapolated. In a further example, the data sources may have deep architectures such as from a neural network (e.g., a deep neural network (DNN), a convolution neural network (CNN), a recurrent neural network (RNN), etc.). Thus, the data sources 122 may represent any source that is characterized in any manner upon which fusion operations according to the exemplary embodiments may be performed.

In the exemplary embodiments, the fusion server 130 may include a normalization program 132 and a feature fusion program 134 including an embedding level feature (ELF) fusion sub-program 136 and a multi-modal discriminative level feature (MDLF) fusion sub-program 138 that may include a pair-wise matching fusion program 140, and a deep correlation fusion program 142 and act as a server in a client-server relationship with the service client 112 as well as be in a communicative relationship with the data repository 120. The fusion server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the fusion server 130 is shown as a single device, in other embodiments, the fusion server 130 may be comprised of a cluster or plurality of computing devices, working together or working independently. While the fusion server 130 is also shown as a separate component, in other embodiments, the operations and features of the fusion server 130 may be incorporated with one or more of the other components of the weighted deep fusion system 100. For example, the operations and features of the fusion server 130 may be incorporated in the smart device 110, particularly the smart device 110 of the user who is requesting the data. The fusion server 130 is described in greater detail as a hardware implementation with reference to FIG. 3, as part of a cloud implementation with reference to FIG. 4, and/or as utilizing functional abstraction layers for processing with reference to FIG. 5.

The fusion server 130 is configured to, in response to a request for data, construct a discriminative and comprehensive fusion network (e.g., a neural network) that is capable of understanding distinctive representations and learn correlative information among different modality inputs. To provide this feature, the fusion server 130 utilizes an AWD fusion mechanism that amplifies the higher quality and informative modalities during fusion in multi-modal classifications. The AWD fusion performed by the fusion server 130 employs a two stage fusion approach to capture both correlated and independent information in multi-modalities with respect to depths of the neural networks (e.g., intermediate neural layers). As will be described in further detail below, the AWD fusion includes an ELF fusion and a MDLF fusion. The ELF fusion may include operations that consider a flow of information among different modality inputs to explicitly encourage an intra-class compactness and inter-class separability in a first stage when using a multi-channel approach. The MDLF fusion may consider features learned by the neural networks and may merge the features using an integration strategy that non-linearly aggregates the representative features. The MDLF fusion may utilize a deep correlation fusion operation, a pair-wise matching fusion operation, or a combination thereof. Using the ELF fusion and the MDLF fusion, the fusion server 130 may achieve benefits associated with early and late fusion approaches, respectively. Subsequently, the AWD fusion may apply both vertical and horizontal combinations (e.g., concatenations) among the fused inputs and feed the results into a new classifier for final predictions that are used in generating the response to the request for data. Through a concatenation operation and other merging/combination operations, the AWD fusion may maintain the independent aspects of the modality inputs as well as incorporate correlation information of the modality inputs.

The exemplary embodiments are described with regard to receiving a request for data and generating a response for the request where the response is generated based on information determined as a result of performing the operations of the AWD fusion according to the exemplary embodiments. However, the exemplary embodiments being utilized as a request and response format is only exemplary. The fusion server 130 may be configured to utilize the AWD fusion at a variety of other times. For example, in preparation to provide data, the fusion server 130 may fuse data using the AWD fusion utilizing various determinations as inputs. Accordingly, when a request is subsequently received, the fusion server 130 may determine which fused data has inputs and/or parameters that correspond to the request or utilize the modalities inputs linked to the fused data. The AWD fusion may also be performed partially to reduce processing requirements. Thus, upon receiving a request, the AWD fusion may be performed dynamically to correspond to the request utilizing a base set of fused data.

In the exemplary embodiments, the normalization program 132 may be a software, hardware, and/or firmware application configured to determine or select features for which operations of the AWD fusion are to be performed. Through a manual selection of the features (e.g., by the user submitting the request, by an administrator managing the fusion server 130, etc.) or an automated determination in selecting the features based on original inputs (e.g., the request for data with further parameters and the modalities inputs), the normalization program 132 may select the appropriate features that are directed toward the request such that results of the AWD fusion being fed into a classifier result in applicable predictions in generating the response to the request. In the automated determination in selecting the features, the normalization program 132 may select the features based on distributions, embeddings, sub-spaces, etc. of the neural network used as modality inputs.

In the exemplary embodiments, the feature fusion program 134 may be a software, hardware, and/or firmware application configured to incorporate features of an early approach and a late fusion approach. Specifically, late fusion considers that the modalities are independent by first applying classification separately on each modality and then merging the output using a high-level classifier while early fusion learns features and class relationships to model the interaction between modalities. Through the ELF fusion sub-program 136 and the MDLF fusion sub-program 138 of the feature fusion program 134, the AWD fusion may apply late and early fusion, respectively, to fuse different types of features selected via the normalization program 132 to generate more informative and significant features to represent the inputs of the request.

In the exemplary embodiments, the ELF fusion sub-program 136 may be a software, hardware, and/or firmware application configured to concatenate sets of features from raw inputs to achieve the benefits of utilizing the late fusion approach. The dimension of the fused features may be equal to the summation of the dimensions of the sets of features. The MDLF fusion sub-program 138 may be a software, hardware, and/or firmware application configured to combine the sets of features learned by the models to achieve the benefits of utilizing the early fusion approach. For example, each input may generate a set of features and a final fused feature representation may be formulated based on a selected fusion method. Further details of the operations involved in the ELF fusion sub-program 136 and the MDLF fusion sub-program 138 will be described below.

The MDLF fusion sub-program 138 may utilize a plurality of different operations to achieve the early fusion benefits. Specifically, the MDLF fusion sub-program 138 may perform a pair-wise matching fusion operation via a pair-wise matching fusion program 140 and/or a deep correlation fusion operation via a deep correlation fusion program 142. In this manner, the pair-wise matching fusion program 140 may be a software, hardware, and/or firmware application configured to calculate a pair-wise matching matrix that indicates the pair-wise matching degree among different embedding inputs according to embeddings obtained for different input features. Accordingly, the pair-wise matching fusion program 140 may determine probability distributions for inputs of the matrix. The deep correlation fusion program 142 may be a software, hardware, and/or firmware application configured to automatically determine an importance of each individual correlation. Accordingly, the deep correlation fusion program 142 may determine or explicitly learn the contributions of each individual correlation so that the final decision or predictions may be ascertained via a classifier.

Figure 2:
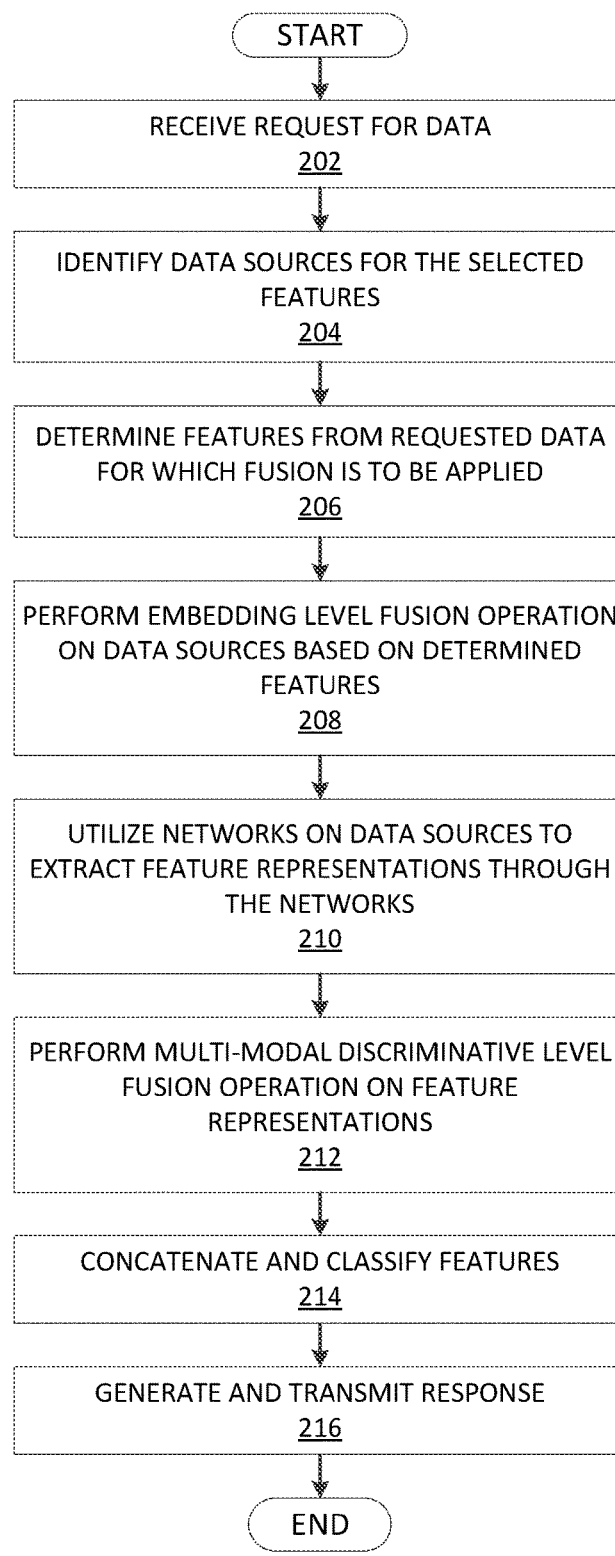
FIG. 2 depicts an exemplary flowchart of a method illustrating the operations of a fusion server 130 of the weighted deep fusion system 100 in fusing features from heterogeneous data sources, in accordance with the exemplary embodiments.

FIG. 2 depicts an exemplary flowchart of a method 200 illustrating the operations of the fusion server 130 of the weighted deep fusion system 100 in fusing features from heterogeneous data sources providing modalities inputs, in accordance with the exemplary embodiments. The method 200 may relate to operations that are performed by the normalization program 132 and the feature fusion program 134 to achieve early and late fusion aspects. The method 200 will be described from the perspective of the fusion server 130.

The fusion server 130 may receive a request for data (step 202). A user may request data using the service client 112 and select a type of data or collection of data that is to be provided. In creating the request, the user may also provide other pertinent information as inputs for the fusion server 130. As will be described in further detail below, the request may provide at least a partial basis upon which to determine features for which the operations of the AWD fusion are to be performed. For example, the type of data that is selected may be for an EHR of a patient. Accordingly, the user may select that the EHR is the type of data to be provided. In generating the EHR, information from a variety of sources may be incorporated or fused using the AWD fusion according to the exemplary embodiments. The request may also indicate a purpose for requesting the EHR such as for diagnostic reasons to detect early symptoms of diseases.

With the EHR providing information such as demographics, diagnosis codes, image features, laboratory results, etc. which is based on a plurality of independent data sources 122, the EHR being comprehensive and capable of being used for a holistic assessment may be paramount. As will be described below, the AWD fusion according to the exemplary embodiments may be configured to fuse the data of the independent data sources 122 in an appropriate manner such that the response to the request may be dynamically provided to address the needs of the user (e.g., through a regularization operation of weighting that results in the features sharing the same weight from a dense layer).

Based on the normalization operation, the fusion server 130 may identify the data sources 122 that are used for the subsequent operations (step 204). For example, when the request indicates an EHR is to be provided, the fusion server 130 may identify the data sources 122 that are related to medical health records, particularly those that may be directed for a patient identified in the request. As described above, the data sources 122 may be modalities inputs that may be formatted in a variety of manners including the various types of neural networks.

The fusion server 130 may perform a normalization operation from processing available data (e.g., the data sources 122, the data in the request, etc.) (step 206). Through the normalization operation, the fusion server 130 may determine or select features to be used for the AWD fusion. The normalization program 132 of the fusion server 130 may be configured to perform the normalization operation and the feature selection. In determining the features to be used, the normalization program 132 may select the features based on properties of the features in the neural networks of the modalities inputs (e.g., distributions, embeddings, subspaces, etc. of the features within a context of the neural networks).

In furtherance of the manner in which the normalization program 132 selects features based on the properties of the modalities inputs relative to the features, the fusion server 130 may be configured to select features that are identified as being a selected significance (e.g., important features that have a significance value that satisfies a significance threshold based on the manner in which features are selected). For example, the fusion server 130 may determine significance values based on how the features ultimately impact the final prediction results. The selected significance may be representative of a distribution of the feature in the modalities inputs. For example, the fusion server 130 may directly select features based on distributions of the original inputs (e.g., the request, the data sources 122, etc.) and calculating similarities among them. Accordingly, a feature having a calculated similarity that satisfies a similarity threshold may be identified as an important feature that is to be selected. In another example, the fusion server 130 may capture feature representations through the deep neural networks. In a particular implementation, the fusion server 130 may utilize CNN models that provide higher classification accuracy than that of low-level and mid-level methods on multiple classification tasks. As such, CNN models may provide improved results indicative of features extracted therefrom that are more typical and representative.

Based on the identified features and a set of the data sources 122, the fusion server 130 may perform a plurality of feature fusion operations. The feature fusion operations performed by the fusion server 130 may incorporate aspects of early fusion approaches and late fusion approaches. As those skilled in the art will understand, late fusion considers that the modalities are independent by first applying a classification separately on each modality and then merging the output using a high-level classifier. In this manner, modality independence may be incorporated in the fusion operations. Early fusion approach learns features and class relationships to model interactions among modalities. In this manner, correlations among modalities may be modelled. Through incorporating features from both early and late fusion approaches, the fusion server 130 is configured to generate more informative and significant features to represent the inputs. As will be described below, the fusion server 130 may utilize a first set of fusion operations (e.g., ELF fusion) for the early fusion aspects and a second set of fusion operations (e.g., MDLF fusion including pair-wise matching fusion and/or deep correlation fusion) for the late fusion aspects.

The fusion server 130 may perform an ELF fusion operation on the data sources 122 based on the determined features (step 208). The ELF fusion operation may be performed by the ELF fusion sub-program 136 of the feature fusion program 134. The ELF fusion operation may provide the aspects associated with early fusion approaches by concatenating sets of features from raw inputs. As will be described below, in using the ELF fusion operation, the dimension of the fused features is equal to the summation of the dimensions of the sets of features.

The ELF fusion operation may be a feature level fusion approach in a multi-channel architecture that takes advantage of relevant feature subspaces (e.g., embeddings) from multiple modalities. The input of each channel of the multi-channel architecture may be task-specific embeddings across all modalities. For example, the fusion server 130 may train each modality independently to extract general mono-modal representations (e.g., text and image embeddings). In another example, the fusion server 130 may align temporal sequences inputs together via a correlation mechanism, so that the properties of the sequences determined to be important in one channel (e.g., above an importance threshold) may be reflected in the others. Those skilled in the art will understand that there are a variety of different correlation mechanisms. The exemplary embodiments are configured to utilize any appropriate correlation mechanism that enables the features of the operations of the fusion server 130. According to an exemplary implementation, the fusion server 130 may initially independently train the modality and subsequently align the temporal sequences inputs.

In performing the ELF fusion operation, the fusion server 130 may utilize a similarity matrix $S_{ij}$ to align two representative feature maps across inputs $I_i$ and $I_j$ that aids the model to assign a higher score to important events over other events (e.g., features). The rows of the similarity matrix $S_{ij}$ may represent a distribution of vectors of feature $I_i$ and the columns of the similarity matrix $S_{ij}$ may represent a distribution of feature $I_j$. The values in the rows of the similarity matrix $S_{ij}$ may denote a distribution of similarity weights of the elements of vector $I_i$ with respect to $I_j$. The values in the columns of the similarity matrix $S_{ij}$ may represent a distribution of similarity weights of the elements of $I_j$ with respect to $I_i$. Accordingly, the concatenation may contain a plurality of parts. For example, a first part may represent distinctive information in each modality while a second part may represent correlative information between multi-modalities. As will be described in further detail below, the fusion server 130 may use the information learned using the ELF fusion operation to be combined in both vertical and horizontal concatenation orders. Furthermore, the combinations may be used as inputs of a new model trained to conduct a prediction task that ultimately leads to information used in generating the response to the request for data.

The fusion server 130 may utilize networks on the data sources 122 to extract feature representations through the networks (step 208). In an analogous operation to determining features to be used to perform the ELF fusion operation, in preparation to perform the MDLF fusion operation, the fusion server 130 may extract corresponding feature representations. To compensate for integrating information in an early stage as used in early fusion approaches which may be affected by a degree of differences between input modalities, the fusion server 130 may perform the MDLF fusion operation to explore learning the fusion correlated matrix via intermediate layers of different network branches based on the neural networks of the modalities inputs. The fusion server 130 may further consider that different modalities of the same class have a strong representation for a given category (e.g., for a feature) in a deeper layer compared to initial layers of the neural network where modalities of different categories have a higher probability of being less correlative. Accordingly, the fusion server 130 may perform the MDLF fusion on the outputs of the deeper fully connected layer to capture rich information from multi-modal features and contribute to improve a performance of learning frameworks that may be used for predictions. In this manner, the fusion server 130 may determine feature representations based on the neural networks of the modalities inputs through any feature representation extraction mechanism.

The fusion server 130 may perform a MDLF fusion operation on the data sources 122 based on the selected features (step 212). Specifically, the fusion server 130 may perform the MDLF fusion operation on the feature representations. The MDLF fusion operation may be performed by the MDLF fusion sub-program 138 of the feature fusion program 134. The MDLF fusion operation may provide the aspects associated with late fusion approaches by combining sets of features learned by the models. For example, each input $I_i$ may generate a set of features that may be denoted as $F_{li}$ and a final fused feature representation may be formulated as $F_{f(Ii, Ij, \ldots)} = W(F(I_i), F(I_j), \ldots)$, where W may be a selected fusion method. Those skilled in the art will understand that there are a variety of different fusion methods that may be applicable at this stage of the AWD fusion. The exemplary embodiments are configured to utilize any appropriate fusion method that enables the features of the operations of the fusion server 130. In a particular implementation, the MDLF fusion operation may entail applying different network structures for the modalities inputs to extract the feature representations through the neural networks of the modalities inputs. For example, the modalities inputs may have different network structures. The MDLF fusion operation may determine distinctive information under a supervision of the structured loss due to the network structures of the modalities inputs. Those skilled in the art will appreciate that, if the model or network structures of the modalities inputs are different, it may be beneficial to conduct the MDLF fusion operation since the learned feature representations may be different.

In contrast to the approach utilized for feature level fusion, according to the MDLF fusion operation, the fusion server 130 may fuse features based on the neural networks, which are trained independently for each of the modalities, thereby allowing for representations to be extracted from specific layers. For example, a fully connected (FC) layer may be connected to a distinctive part to reduce a dimension and may be capable of learning distinctive information under supervision of a structured loss. Further FC layers may be generated based on previous FC layers. The multiple modalities of a same class have a likelihood of having a strong correlation and the modalities of different classes have a likelihood of having a weak correlation. Therefore, the fusion server 130 may conduct the fusion based on the outputs of the FC layer that results in the fusion server 130 capturing rich information from multi-modal features that are used to contribute to the process of classifications.

In performing the MDLF fusion operation, the fusion server 130 may utilize two streams that are combined in a second stage FC (FC2) layer. The fusion server 130 may initialize weights in the two input streams based on the trained networks in the first stage of the FC layer. The FC2 layers of both input streams may also be divided into a plurality of parts. For example, a first part of the input streams in the FC2 layer may represent the distinctive information in each modality. In another example, a second part of the input streams in the FC2 layer may be configured to capture correlative information according to the representations learned by the neural networks.

After learning discriminative representations for each input modality, the fusion server 130 may be configured to directly concatenate the representations. Those skilled in the art will appreciate that the AWD fusion performed by the fusion server 130 up until this stage may already provide a more discriminative representation than conventional approaches. Thus, the AWD fusion may generate a response based on the results that have so far been ascertained. However, to further capture characteristics of the features, the fusion server 130 may be configured to consider correlations between the representations. Thus, the fusion server 130 may utilize further fusion architectures that are configured to explore the correlations between different inputs while simultaneously retain the distinctiveness in the multiple modalities. In performing the MDLF fusion operation, the fusion server 130 may perform a pair-wise matching fusion operation, a deep correlation fusion operation, or a combination thereof.

The pair-wise matching fusion operation may be performed by the pair-wise matching fusion program 140 of the fusion server 130. After obtaining the embeddings of the different input features, the fusion server 130 may calculate a pair-wise matching matrix. The pair-wise matching matrix may indicate the pair-wise matching degree among different embedding inputs. The fusion server 130 may compute a matching score based on a dot product of given feature vectors Ii and Ij of the matching score matrix M (e.g., calculated as $M = M = I_i^T \cdot I_j$, where T represents a transpose variable). Accordingly, the value of an element of the matching score matrix may be determined, for example, as $M_{kl} = I_i(k) \cdot I_j(l)$. After determining the pair-wise matching matrix M, the fusion server 130 may apply a column-wise or row-wise normalization function to determine probability distributions in each column or row, respectively. Those skilled in the art will understand that there are a variety of different normalization functions that may be applicable at this stage of the AWD fusion such as soft-max, min-max normalization, standardizing (e.g., z-score), etc. The exemplary embodiments are configured to utilize any appropriate normalization function that enables the features of the operations of the fusion server 130.

The deep correlation fusion operation may be performed by the deep correlation fusion program 142 of the fusion server 130. Instead of using naive heuristics (e.g., summing or averaging) to combine the individual correlations into a final fusion, the fusion server 130 may utilize the deep correlation fusion operation to automatically determine the importance of each individual (e.g., determining an important value based on how each individual affects the final predictions such as a respective importance threshold). As described above, in a manner substantially similar to the pair-wise matching fusion operation, the fusion server 130 may generate the matrix M. Using the matrix M, for the deep correlation fusion operation, the fusion server 130 may apply a column-wise function to the matrix M to calculate an $I_i$-level correlation. Thus, for every element in the feature vector $I_i$, the fusion server 130 may calculate a degree of importance distribution relative to other inputs $I_j$, thereby indicating which elements in feature vector $I_j$ are more important given $I_i$ vector. Similarly, the fusion server 130 may apply a row-wise function to the pair-wise matching matrix M to determine $I_j$-level correlations. Accordingly, the fusion server 130 may have obtained both $I_i$-to-$I_j$ correlation denoted as $\alpha$ and $I_j$-to-$I_i$ correlation denoted as $\beta$. Subsequently, the fusion server 130 may calculate a dot product of both the correlations to exploit mutual information denoted as s between them such that $s=\alpha^T\beta$.

By utilizing the above operations, the fusion server 130 may determine the contributions by each individual correlation which may be learned explicitly. The final decision may be made through the diagonal values in s, which represents a weighted sum of each individual $I_i$-level correlation when looking at the corresponding vector in the $I_j$-level and vice versa.

The fusion server 130 may concatenate and classify the results of performing the above operations including the ELF fusion operation, the MDLF fusion operation, the pair-wise matching fusion operation, and the deep correlation fusion operation (step 214). For example, the ELF fusion operation may determine features for processing to provide early fusion characteristics while the MFLD fusion operation (e.g., via the pair-wise matching fusion operation, the deep correlation fusion operation, or a combination thereof) may determine feature representations for processing to provide late fusion characteristics. The outputs of the ELF fusion operation and the MDLF fusion operation may be combined in a feature fusion operation through a plurality of concatenation (e.g., horizontal and vertical) and classification operations (e.g., via a classifier). With the use of fusion of the features, the fusion server 130 may perform the classification more accurately than an object classified with a single feature. To tune the weights among these features, the fusion server conducts both vertical and horizontal concatenations to combine features that are learned from the mono-modal inputs. Subsequently, the fusion server adopts the FC layer to automatically optimize the weights on the feature sets, which generate building blocks for merging relevant features from multiple modalities.

The fusion server 130 may utilize all the results from the above operations to generate a response to the request from the user (step 216). For example, when the user requests the EHR of a specified patient, the fusion server 130 may concatenate and classify all the results from a plurality of data sources 122 for various features that are fused in a manner that provides a meaningful generating of the EHR for purposes of the user. Accordingly, the response may be transmitted to the user.

The exemplary embodiments are configured to provide an automatic deep fusion architecture for multi-modal classifications in which information from a plurality of data sources are fused in a meaningful way. The fused data resulting from the AWD fusion according to the exemplary embodiments consider each modality input as an independent entity to learn representations for classifications through concatenation. Furthermore, the fused data resulting from the AWD fusion according to the exemplary embodiments explicitly identify correlation information between the inputs which may then be concatenated with the original inputs to generate a final fusion feature. To provide the benefits of both an early fusion approach and a late fusion approach, the exemplary embodiments utilize an embedding level fusion, a multi-modal discriminative level fusion, a pair-wise matching fusion, and a deep correlation fusion.

Figure 3:
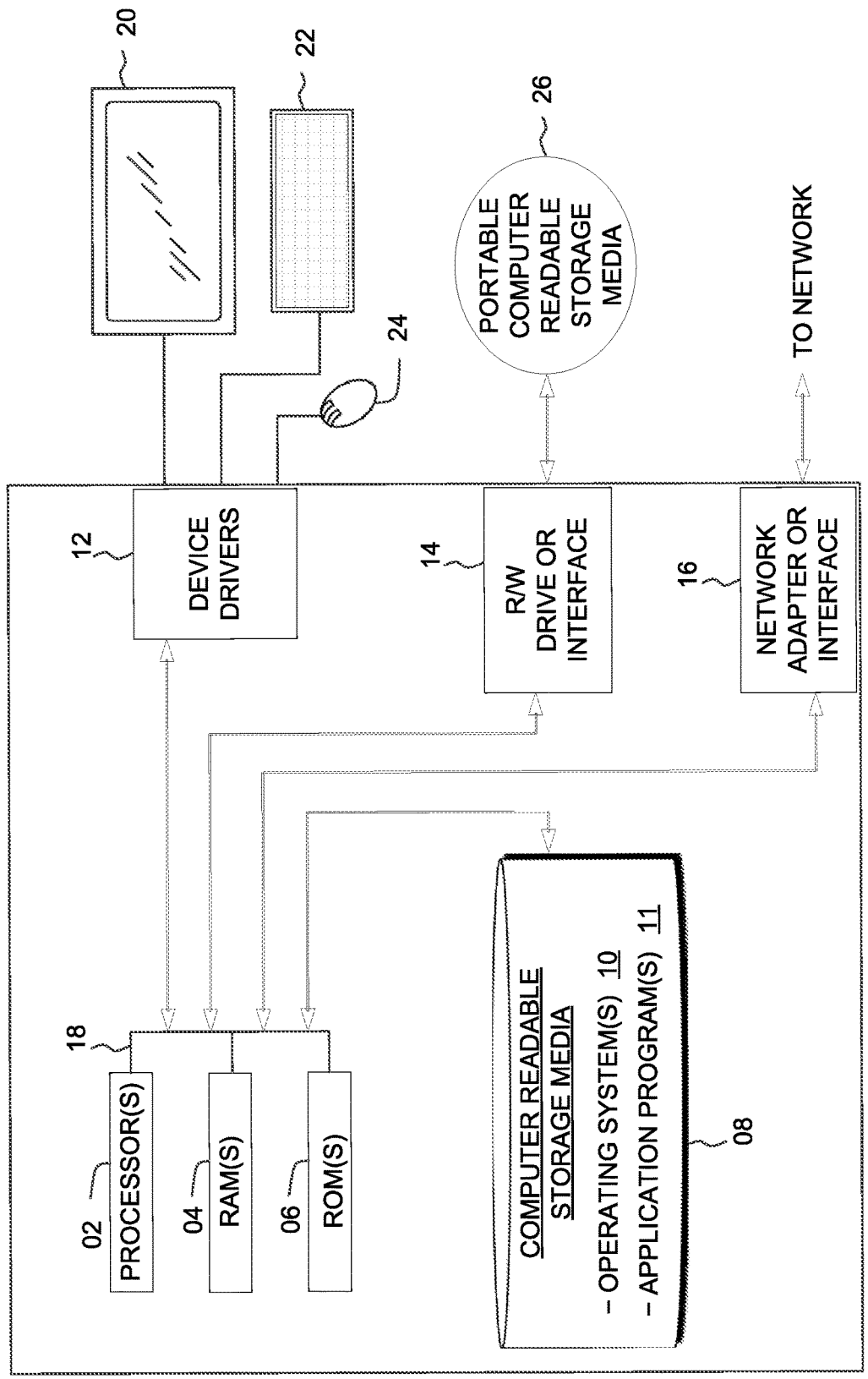
FIG. 3 depicts an exemplary block diagram depicting the hardware components of the weighted deep fusion system 100 of FIG. 1, in accordance with the exemplary embodiments.

FIG. 3 depicts a block diagram of devices within the weighted deep fusion system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
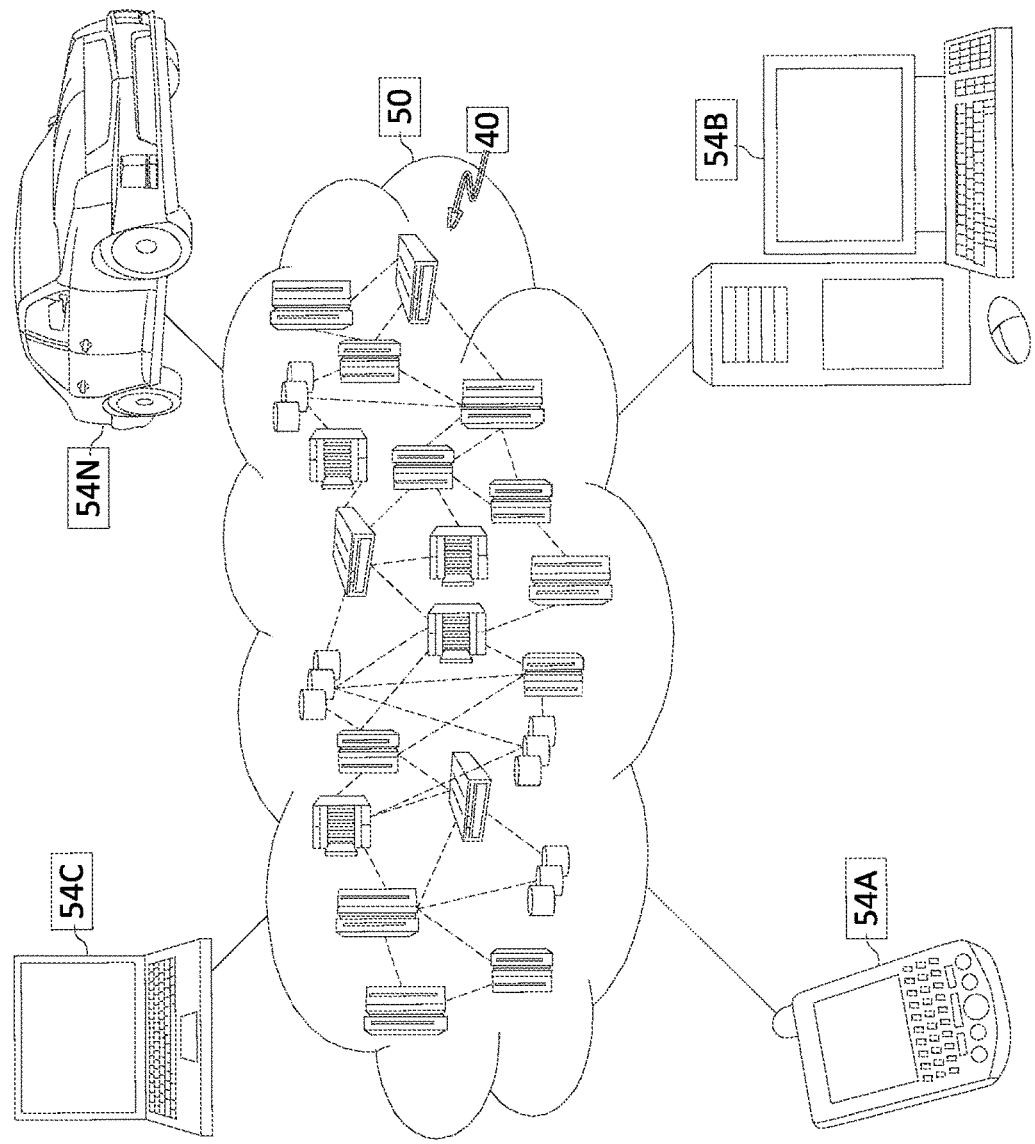
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
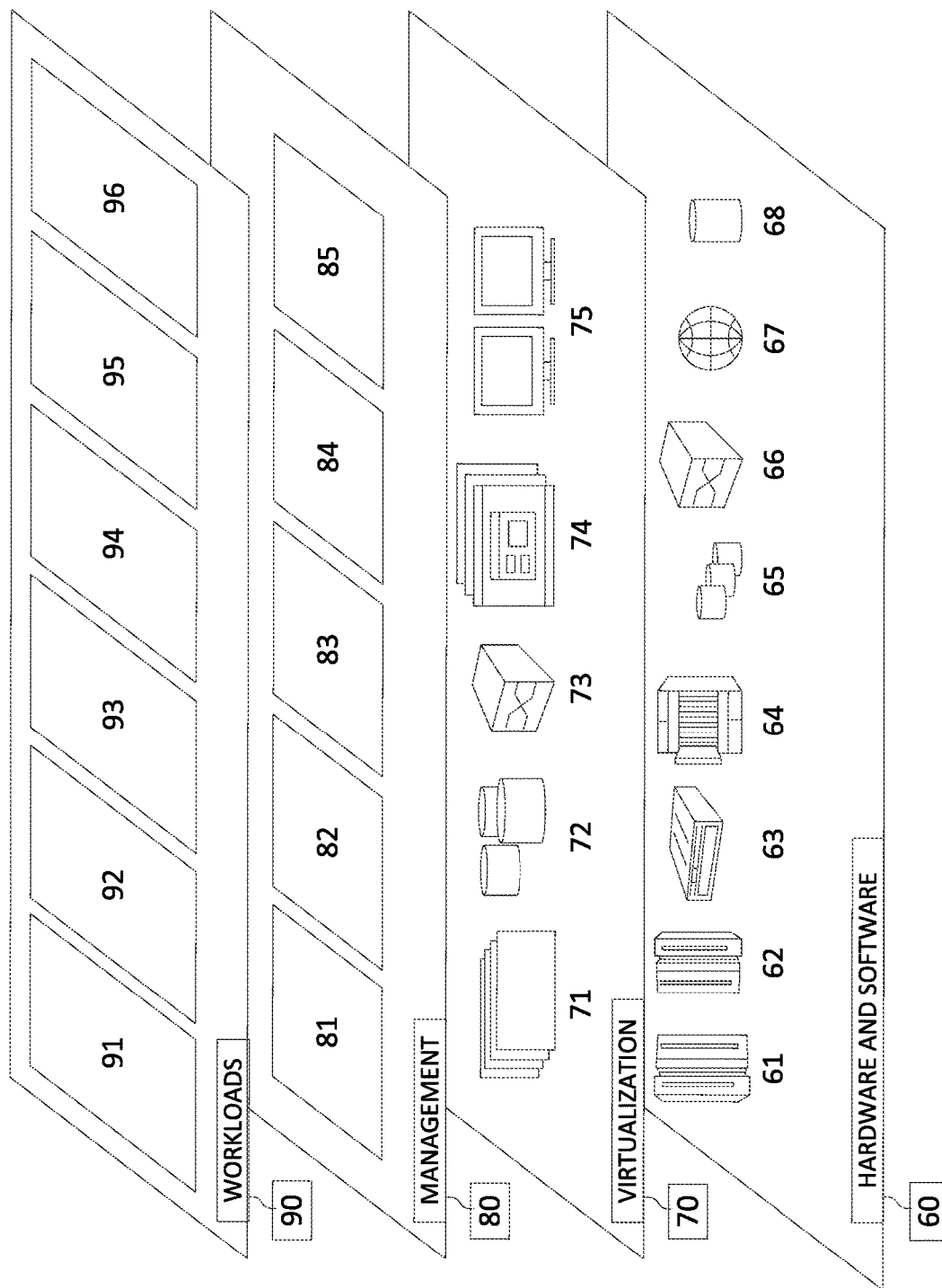
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fusion processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for fusing data for multi-modal classifications for a plurality of modality inputs, the computer-implemented method comprising:
   receiving, by a system operatively coupled to a processor, via the Internet, from an entity employing a service client at a first location remote from a second location, a request indicative of the modality inputs to be selected, the modality inputs including text, audio, and video;
   performing, by the system, via a multi-modal embeddings level fusion of automatic weighted deep fusion (AWD) process, features from the modality inputs employing a similarity matrix by aligning representative feature maps across the modality inputs;
   applying, by the system, different network structures on the modality inputs;
   integrating, by the system, via a multi-modal discriminative feature level fusion of the AWD process, feature representations learned by the applying the different network structures on the modality inputs;
   generating, by the system, weights of the concatenated features and the feature representations based on a measure of the concatenated features and the feature representations indicative of affecting a final prediction performance;
   generating, by the system, fused features for the modality inputs based on the concatenated features, the feature representations, and the weights;
   generating, by the system, a response to the request based on the fused features; and
   transmitting, by the system, via the Internet, the response to the service client associated with the entity.

2. The computer-implemented method of claim 1, wherein the modality inputs have a deep architecture including a convolution neural network, a recurrent neural network, or a combination thereof.

3. The computer-implemented method of claim 1, wherein the concatenated features in the modality inputs are concatenated based on a distribution, an embedding, or a combination thereof of the feature in the modality inputs.

4. The computer-implemented method of claim 1, wherein the multi-modal discriminative level feature fusion operation includes a deep correlation fusion operation that determines contributions of correlations of the feature representations.

5. The computer-implemented method of claim 4, wherein the deep correlation fusion operation determines a degree of correlation of a first one of the feature representations to a second one of the feature representations.

6. The computer-implemented method of claim 5, wherein the deep correlation fusion operation determines a corresponding contribution for each of the modality inputs through a weighted sum of each degree of correlation of the feature representations.

7. The computer-implemented method of claim 1, wherein the multi-modal discriminative level feature fusion operation includes a pair-wise matching fusion operation is indicative of a pair-wise matching degree of the feature representations according to embeddings obtained for different modality inputs.

8. A computer program product for fusing data for multi-modal classifications for a plurality of modality inputs, the computer program product comprising:
   one or more non-transitory computer-readable storage media and program instructions stored on the one or more non-transitory computer-readable storage media capable of performing a method, the method comprising:
   receiving, via the Internet, from an entity employing a service client at a first location remote from a second location of the computer program product, a request indicative of the modality inputs to be selected, the modality inputs including text, audio, and video;
   concatenating, via a multi-modal embeddings level fusion of automatic weighted deep fusion (AWD) process, features from the modality inputs employing a similarity matrix by aligning representative feature maps across the modality inputs;
   applying different network structures on the modality inputs;
   integrating, via a multi-modal discriminative feature level fusion of the AWD process, feature representations learned by the applying the different network structures on the modality inputs;

generating weights of the concatenated features and the feature representations based on a measure of the concatenated features and the feature representations indicative of affecting a final prediction performance;

generating fused features for the modality inputs based on the concatenated features, the feature representations, and the weights;

generating a response to the request based on the fused features; and transmitting, via the Internet, the response to the service client associated with the entity.

9. The computer program product of claim 8, wherein the modality inputs have a deep architecture including a convolution neural network, a recurrent neural network, or a combination thereof.

10. The computer program product of claim 8, wherein the concatenated features in the modality inputs are concatenated based on a distribution, an embedding, or a combination thereof of the feature in the modality inputs.

11. The computer program product of claim 8, wherein the multi-modal discriminative level feature fusion operation includes a deep correlation fusion operation that determines contributions of correlations of the feature representations.

12. The computer program product of claim 11, wherein the deep correlation fusion operation determines a degree of correlation of a first one of the feature representations to a second one of the feature representations.

13. The computer program product of claim 12, wherein the deep correlation fusion operation determines a corresponding contribution for each of the modality inputs through a weighted sum of each degree of correlation of the feature representations.

14. The computer program product of claim 8, wherein the multi-modal discriminative level feature fusion operation includes a pair-wise matching fusion operation is indicative of a pair-wise matching degree of the feature representations according to embeddings obtained for different modality inputs.

15. A computer system for fusing data for multi-modal classifications for a plurality of modality inputs, the computer system comprising:

one or more computer processors, one or more computer-readable storage media, and program instructions stored on the one or more of the computer-readable storage media for execution by at least one of the one or more computer processors capable of performing a method, the method comprising:

receiving via the Internet, from an entity employing a service client at a first location remote from a second location, a request indicative of the modality inputs to be selected, the modality inputs including text, audio, and video;

performing, via a multi-modal embeddings level fusion operation to concatenate of automatic weighted deep fusion (AWD) process, features from the modality inputs based on a similarity matrix that aligns representative feature maps across the modality inputs;

applying, by the system, different network structures on the modality inputs;

integrating, via a multi-modal discriminative feature level fusion of the AWD process operation that integrates feature representations learned by the applying the different network structures on the modality inputs;

generating weights of the concatenated features and the feature representations based on a measure of the concatenated features and the feature representations indicative of affecting a final prediction performance;

generating fused features for the modality inputs based on the concatenated features, the feature representations, and the weights;

generating a response to the request based on the fused features; and transmitting, via the Internet, the response to the service client associated with the entity.

16. The computer system of claim 15, wherein the modality inputs have a deep architecture including a convolution neural network, a recurrent neural network, or a combination thereof.

17. The computer system of claim 15, wherein the concatenated features in the modality inputs are concatenated based on a distribution, an embedding, or a combination thereof of the feature in the modality inputs.

18. The computer system of claim 15, wherein the multi-modal discriminative level feature fusion operation includes a deep correlation fusion operation that determines contributions of correlations of the feature representations.

19. The computer system of claim 18, wherein the deep correlation fusion operation determines a degree of correlation of a first one of the feature representations to a second one of the feature representations.

20. The computer system of claim 19, wherein the deep correlation fusion operation determines a corresponding contribution for each of the modality inputs through a weighted sum of each degree of correlation of the feature representations.

* * * * *